July 8, 1952 L. W. WHITAKER 2,602,896
SAW-TOOTH WAVE GENERATOR
Filed Sept. 9, 1948
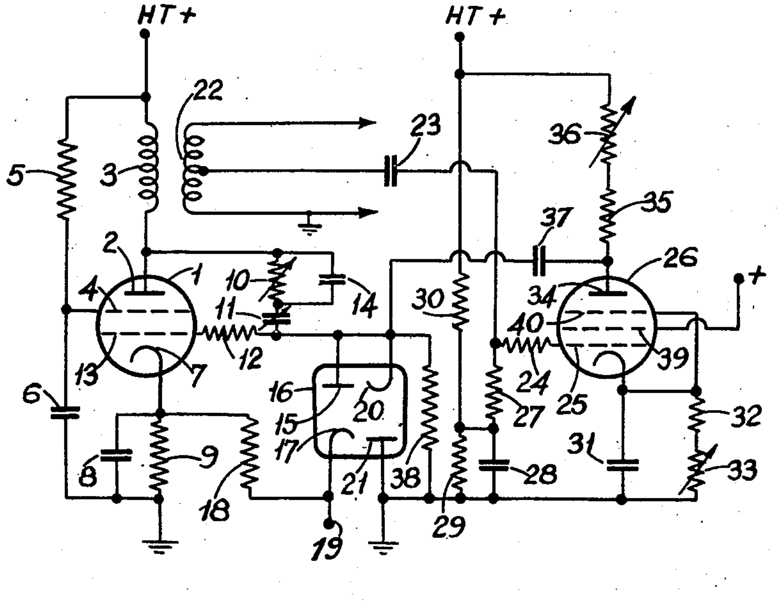
Inventor:
Leonard William Whitaker,
By their attorneys,
Baldwin, Wight, & Prevost Patented July 8, 1952 2,602,896

UNITED STATES PATENT OFFICE 2,602,896

SAW-TOOTH WAVE GENERATOR

Leonard William Whitaker, Ridgeway, Enfield, England, assignor to Marconi's Wireless Telegraph Company Limited, London, England, a company of Great Britain Application September 9, 1948, Serial No. 48,465
In Great Britain October 16, 1947

8 Claims. (Cl. 250—36)

This invention relates to saw-tooth wave generators and more particularly to such generators suitable for use for the production of saw-tooth waves for effecting electro-magnetic scanning line deflection in television cathode ray tubes and for purposes involving similar requirements.

It is very desirable that generators for use for purposes such as that above mentioned shall have a high degree of rectilinearity, shall be economical in the consumption of energy from the high tension source, and shall be at the same time simple, reliable and easily synchronized. The present invention seeks to provide improved saw-tooth wave generators which shall satisfy the requirements of high rectilinearity, economy and simplicity to a greater extent than has hitherto been found possible and which shall at the same time be easily synchronized and capable, if desired, of a good range of operating adjustment.

According to this invention a saw-tooth wave generator suitable for use for effecting electro-magnetic scanning line deflection in television or for similar purposes comprises an output electron discharge tube stage from which the generated saw tooth wave is taken, a triggering electron discharge tube stage, a negative feed-back path between output and input sides of said output stage to render the rise of current from said stage, during rising current periods, substantially rectilinear, a differentiating circuit included between the output side of said output stage and an input electrode of said triggering stage, a coupling between the output side of said triggering stage and an input electrode of said output stage whereby, when said triggering stage is passing current it forms part of a positive feed-back path from output to input of said output stage, and a capacity by-passed resistance circuit associated with said triggering stage and adapted to render said stage conductive when a predetermined state of discharge of said capacity is attained, the whole arrangement being such that the two stages constitute a generator which is self-running even in the absence of applied impulses and in which the triggering stage is conductive substantially only during fly-back periods, i. e. during short periods immediately following each rectilinearly increasing current period of the output stage.

Preferably means including a rectifier for applying negative synchronizing pulses to an input electrode of said output stage are provided.

Preferably also the capacity by-passed resistance circuit is in the cathode leg circuit of the triggering stage said circuit preferably including an adjustable element, in practice an adjustable resistance.

Again preferably the negative feed back path is between the anode and control grid of the output stage and comprises a resistance in series with a condenser which is preferably adjustable.

The saw tooth wave output is preferably taken through a transformer, a tap on the secondary of which is connected through the differentiating circuit to the triggering stage one side of said secondary being earthed. Alternatively the center point of the secondary may be earthed and a tap on one side thereof taken through the differentiating circuit to the triggering stage.

The coupling between the output side of the triggering stage and an input electrode of the output stage is preferably resistance-capacity coupling and an adjustable resistance is preferably included between the positive terminal of a common HT source for both stages and the output side of the triggering stage.

The invention is illustrated in the accompanying drawing which shows diagrammatically one embodiment thereof.

Referring to the drawing an output tube 1 in the form of a screen grid tube has its anode 2 connected to HT+ through the primary 3 of a transformer which should either be of fairly small primary magnetizing current in relation to the load component of current in the primary or should have low primary leakage inductance and resistance. The screen grid 4 is connected to HT+ through a resistance 5 and to earth through a condenser 6 while the cathode 7 is connected to earth through a self-bias circuit consisting of a bias condenser 8 and bias resistance 9 in parallel. The anode 2 is connected through a resistance 10 in series with a preferably adjustable condenser 11 in series with an anti-parasitic resistance 12 to the control grid 13. The resistance 10, which is shunted by a very small condenser 14 the purpose of which is merely to maintain negative feed-back at high frequencies (so that primary resonances generated by rapid fly-back action are damped out and do not persist in the early part of the scanning line portion of the wave), co-operates with the adjustable condenser 11 to provide linearizing negative feed-back across the output tube, the said resistance 10 (which may also be adjustable as indicated) controlling the inductive component of the primary voltage of the transformer and the said condenser 11 controlling the resistive component. An anode 15 of a double diode 16 is connected through the anti-parasitic resistance 12 to the control grid 13 of the tube 1 and the co-operating cathode 17 of said double diode is connected to earth through a resistance 18 in series with the self-bias circuit 8—9. Negative going synchronizing pulses are applied at 19 to the diode cathode end of resistance 18. The half 15—17 of the double diode prevents the impedance of the synchronizing source (not shown) from being connected to the grid 13 of the output tube during the scanning line and later fly-back portions of the wave. The second half of the double diode has its cathode 20 connected to the anode 15 of the first half and its anode 21 earthed.

The secondary of the transformer feeds the load (not shown, but presumed to be a cathode ray tube deflection coil) and is earthed on one side and provided with a tap which is connected through a condenser 23 and resistance 24 in series to the control grid 25 of a triggering tube 26 which may be a pentode as indicated. Alternatively the center tap of the secondary may be earthed and a second tap connected through said resistance and condenser to the triggering tube control grid. In either case the resistance 24 is merely a grid current limiting resistance but the condenser 23 forms part of a differentiating circuit the other part of which is constituted by a resistance 27 connected between said condenser and one side of a de-coupling condenser 28 whose other side is earthed. The de-coupling condenser 28 is in parallel with a resistance 29 which, in conjunction with a further resistance 30 in series between it and HT+ constitutes a potentiometer the tap upon which is connected to the junction point of circuit elements 27 and 28.

The cathode of the pentode is earthed through a capacity by-passed resistance circuit consisting of a condenser 31 shunted by a fixed resistance 32 in series with an adjustable resistance 33, adjustment of the latter controlling the repetition frequency of the whole generator. The anode 34 of the triggering pentode 26 is connected to HT+ through fixed and adjustable resistances 35, 36 in series, adjustment of resistance 36 controlling the amplitude generated. The said anode 34 is also connected to the control grid 13 of the output tube 1 through a coupling condenser 37 in series with the anti-parasitic resistance 12 already mentioned and a coupling resistance 38 on the output tube side of this condenser is connected across the second half 20—21 of the double diode 16 which accordingly serves to maintain substantially the same mean DC potential across condenser 37 for all adjustments of the amplitude control resistance 36. The screen and suppressor grids 39, 40 of the pentode 26 are connected in the normal way.

With this arrangement, suitably, adjusted, the triggering tube 26 and both halves of the double diode 16 are cut off during the scanning line portion of the wave, only the output tube 1 taking current. During this portion the control grid 13 moves from near cut-off towards cathode potential, being negative to cathode and taking no current. By suitably adjusting the relative values of the resistance 10 and capacity 11 in the negative feed-back circuit the transformer secondary current may be made to increase accurately rectilinearly with time during this portion of the wave. Of course, the phase of the voltage taken from the transformer secondary to the input side of the triggering stage must be the same as that at the anode of the output valve; in other words the sense of the transformer windings must be such that when, for example, the anode voltage of the output valve is rapidly rising during the early part of the flyback period, so also is the input voltage to the triggering stage. The output current amplitude reaches a predetermined value dependent upon the adjustment of the variable resistance 36. The fly-back period commences when the triggering tube begins to conduct and this is determined by the rate of discharge of the resistance-capacity combination 31—32—33 in its cathode circuit. The negative feed back directly from anode to control grid of the output tube 1 is now overcome by the positive feed-back effect through the circuit including the triggering tube 26, the said tube driving the grid 13 of the output tube which in turn drives the triggering tube grid through the condenser 23 of the differentiating circuit. There is accordingly a trigger action, the output tube is cut off and the triggering tube caused to conduct heavily. The potential at the anode of the output tube rises rapidly executing the first quarter cycle of an oscillation whose frequency is mainly dependent on the effective transformer primary inductance and the associated capacity. At the end of this quarter cycle, when the output anode voltage is at a maximum and the current in the primary of the transformer is zero, the triggering tube is cut off and the output tube rendered conductive. It may be remarked that the triggering tube is kept conductive for the requisite period by the action of the differentiating circuit.

It will be observed that the circuit is self-generating even if no synchronizing pulses are applied for, during the fly-back period when the triggering tube is conducting, a substantial current flows into the condenser 31 of the capacity by-passed resistance circuit and accordingly, when the grid 25 of the triggering tube returns to the potential it had during the scanning line portion of the wave the said tube nevertheless stays cut off until said condenser has discharged sufficiently through the associated leak resistance path.

The simplicity of the circuit above described as compared to known generators of like performance will be noted and it will be observed that only the output and triggering tubes apply any load to the HT source, the latter only to a slight extent. Moreover, synchronization is quite easy, and there is practically complete independence of the impedance of the synchronizing source and convenient and full adjustment is provided for. As regards adjustment not the least of the advantages obtained is a high degree of independence of the controls. The linearity control does not appreciably affect amplitude and has no effect on frequency; the amplitude control does not affect linearity though it does have some effect on frequency if there is no synchronizing signal; while the frequency control has no effect on either linearity or rate of change of current so that output current amplitude is inversely proportional to frequency.

What I claim is:

1. A generator of saw-tooth electrical waves comprising in combination a first electron discharge tube stage having output and input electrodes and a cathode circuit, an output circuit connected to said output electrodes, a second electron discharge tube stage having output and input electrodes and a cathode circuit, a negative feed-back resistance-capacity path between the output and input electrodes of said first stage said path being dimensioned to provide substantial rectilinearity of relationship between the output electrode current and the input electrode voltage of said first stage, a positive feed-back impedance path between the output and input electrodes of said first stage, said last mentioned path including in series therein, the space path of said second stage and also including a coupling impedance between the output electrode of said second stage and the input electrode of said first stage, a differentiating circuit included between the output electrode of said first stage and the input electrodes of said second stage, said differentiating circuit including a condenser in the path from said output electrode to said input electrode and a resistance in a path between said input electrode and the cathode circuit of said second stage, and a capacity by-passed resistance circuit connected in the space current path of said second stage on the cathode circuit side thereof and dimensioned to hold said stage cut-off until the capacity in said circuit has discharged to a predetermined state of discharge, the two stages constituting a generator which is self-running even in the absence of applied impulses and in which the second stage is conductive substantially only during short periods immediately following each rectilinearly increasing current period of the first stage.

2. A generator according to claim 1 and comprising also means including a rectifier in the input electrode circuit of the first stage for applying negative synchronizing pulses to the input side of said first stage.

3. A generator according to claim 1 wherein the capactiy by-passed resistance circuit includes an adjustable element.

4. A generator according to claim 1 wherein the capacity by-passed resistance circuit is connected in the cathode leg circuit of said second stage.

5. A generator of saw-tooth electrical waves comprising in combination a first electron discharge tube stage including a first tube having at least an anode, a cathode, and a control grid, an output circuit coupled to said anode, a second electron discharge tube stage including a second tube having at least an anode, a cathode and a control grid, a negative feed-back resistance-capacity path between the anode and control grid of said first tube and dimensioned to provide a rectilinear relationship between anode current and grid voltage of said first tube for increasing anode currents, said negative feed-back path comprising a resistance in series with a condenser, a differentiating circuit included between the anode of said first tube and the grid of said second tube, a coupling between the anode of said second tube and the grid of said first tube, the space path of said second tube being in series in a positive feed-back path from the anode and grid of said first tube, and a capacity by-passed resistance circuit included in circuit with the cathode of said first tube and connected to apply bias to said second tube to permit the same to pass current only when a predetermined state of discharge of said capacity is attained, the two tubes constituting a generator which is self-running even in the absence of applied impulses and in which the second tube is conductive substantially only during short periods immediately following each rectilinearly increasing current period of the output stage.

6. A generator according to claim 5 wherein the output circuit includes a transformer having primary and secondary windings with its primary winding connected in the anode circuit of the first tube having a tap on the secondary winding of said transformer connected through the differentiating circuit to the grid of the second tube, one side of said secondary winding being earthed.

7. A generator according to claim 5 wherein the output circuit includes a transformer having primary and secondary windings with said primary winding connected in the anode circuit of the first tube, said secondary winding having a center tap therein connected with one of the electrodes of said second tube, a tap on said secondary winding at one side of the aforesaid center tap, a connection to earth from said last mentioned tap, said differentiating circuit being interposed between said center tap and the aforesaid connection to one of the electrodes of said second tube.

8. A generator of saw-tooth electrical waves comprising in combination a first electron discharge tube stage having output and input electrodes and a cathode circuit, an output circuit coupled to said output electrode, a second electron discharge tube stage having output and input electrodes and a cathode circuit, a negative feed-back resistance-capacity path between the output and input electrodes of said first stage and dimensioned to render the rise of current in said first stage, substantially rectilinearly proportioned to the input electrode voltage of said first stage, a common high potential source for both said stages, an adjustable resistance included between the positive terminal of said source and the output electrode of said second stage, a resistance-capacity differentiating circuit included between the output electrode of said first stage and the input electrode of said second stage, a coupling between the output electrode of said second stage and the input electrode of said first stage, the space path of said second stage being included in series in a positive feed-back path from output to input electrodes of said first stage, and a capacity by-passed resistance circuit connected in the cathode circuit of said first stage to provide input electrode bias to said second stage to permit the same to conduct only when a predetermined state of discharge of said capacity is attained, the two stages consituting a generator which is self-running even in the absence of applied impulses and in which the second stage is conductive substantially only during short periods immediately following each rectilinearly increasing current period of the first stage.

LEONARD WILLIAM WHITAKER.

REFERENCES CITED

The following references are of record in the file of this patent:

UNITED STATES PATENTS

| Number | Name | Date |
|---|---|---|
| 2,248,975 | Faudell | July 15, 1941 |
| 2,440,252 | Dimond | Apr. 27, 1948 |
| 2,442,770 | Kenyon | June 8, 1948 |
| 2,461,871 | Bass | Feb. 15, 1949 |